United States Patent
Ionov

(10) Patent No.: US 6,240,108 B1
(45) Date of Patent: May 29, 2001

(54) CLADDING PUMPED FIBER LASER WITH REDUCED OVERLAP BETWEEN A LASER MODE AND AN ION-DOPED REGION

(75) Inventor: Stanislav I. Ionov, Calabasas, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/251,776

(22) Filed: Feb. 17, 1999

(51) Int. Cl.[7] ..................................................... H01S 3/30
(52) U.S. Cl. ................... 372/6; 372/102; 385/37; 385/123; 385/124; 385/126; 385/127
(58) Field of Search ................... 372/6, 102, 99, 372/96; 385/37, 123, 124, 126, 127

(56) References Cited

U.S. PATENT DOCUMENTS 5,881,197 * 3/1999 Dong et al. .......................... 385/127
5,991,314 * 11/1999 Ionov et al. ............................ 372/6
6,137,813 * 10/2000 Ionov et al. ............................ 372/6

* cited by examiner

*Primary Examiner*—Robert H. Kim
*Assistant Examiner*—Delma R. Flores Ruiz
(74) *Attorney, Agent, or Firm*—Georgann S. Grunebach

(57) ABSTRACT

A cladding-pumped fiber laser has an optical fiber with a first end and a second end. The optical fiber has a core having an undoped central region and a collar surrounding the core. The collar is doped with a lasing dopant such as rare-earth ions. An inner cladding surrounds the core. A first grating is disposed at the first end of the optical fiber, and a second grating is disposed at the second end. Preferably, the first end has a higher reflectivity than the second end so that the second end acts as the output to the laser.

19 Claims, 2 Drawing Sheets

——— THRESHOLD FOR 1064 NM
- - - - THRESHOLD FOR 1082 NM (PARASITIC)
•••••• LASER OUTPUT AT 1064 NM IN THE ABSENCE OF PARASITIC LASING FOR 9.5 W PUMP

CLADDING PUMPED FIBER LASER WITH REDUCED OVERLAP BETWEEN A LASER MODE AND AN ION-DOPED REGION

TECHNICAL FIELD

The present invention relates to optical fiber lasers, and more particularly, to an optical fiber laser having reduce parasitic lasing.

BACKGROUND ART

A cladding-pumped fiber laser typically comprises a single mode fiber core disposed within a relatively large multi-mode cladding. This inner cladding is surrounded by a second, outer cladding to prevent radiation from propagating out of the inner cladding. The fiber is positioned between two mirrors or gratings to define a laser cavity. Light from a pump laser, such as a laser diode, is injected into the end of the cladding. Typically, the length of the fiber is sufficient for absorbing most of the pure radiation, which propagates in the core, by the active laser species located in the core. This is advantageous since radiation can be coupled into the multi-mode cladding without the high tolerances typically required for coupling light directly into a single mode core. The core is typically doped with rare-earth ions, which are the active lasing species. The ions absorb photons delivered by the pump laser. Photons are then emitted by the ions at a wavelength characteristic of the particular dopant species.

Of particular importance are high power, multi-watt fiber lasers that operate at shorter wavelength, i.e. at less than 1065 nm. The radiation is used to pump Erbium/Ytterbium (Er/Yb) fiber amplifiers operating in the 1.55 $\mu$m. Cladding-pumped Yb fiber lasers that produce multi-watt outputs at 1065 nm have been demonstrated with special high-brightness diode laser sources. However, efficient operation of such lasers at less than 1065 nm is difficult to achieve with commercially available low brightness pump sources, such as diode-coupled fiber bundles.

One problem with the previously known cladding-pumped Yb fiber lasers is that parasitic lasing and amplified spontaneous emission (ASE) occur at a longer wavelength than the design wavelength. When parasitic operations occur, lasing at the design wavelength cannot be achieved, unless the device efficiency is sacrificed by reducing the length of the fiber laser. These limitations become more significant in high power multi-watt applications.

Remedies against parasitic lasing include incorporating highly-selective Bragg gratings as resonator reflectors and angle-cleaved fiber ends for reducing the feedback at the parasitic wavelength. In addition, the fiber laser length may be reduced until parasitic lasing gives way to operation at the desired wavelength. Shortening the length of the fiber, however, is highly undesirable since it reduces the amount of absorbed pump power. This reduces the overall efficiency of the system.

Thus, there is a need for an improved cladding-pumped laser structure that operates at lower wavelengths and reduces parasitic lasing.

SUMMARY OF THE INVENTION

One object of the invention is to prevent parasitic lasing in an optical fiber laser so that it operates at a shorter wavelength without sacrificing its efficiency by reducing the fiber length.

In one aspect of the invention, an optical fiber laser has an optical fiber having a first end and a second end. The fiber has a core with an undoped central region and a collar surrounding the core. The collar is doped with rare-earth ions to form the active laser medium. An inner cladding surrounds the core. A first grating is disposed at the first end of the optical fiber, and a second grating is disposed at the second end. The laser is activated by coupling an optical pump to the first cladding.

One advantage of the invention is that a shorter design wavelength than that normally formed in an optical fiber laser of the same length.

Other objects and features of the present invention will become apparent when viewed in light of the detailed description of the preferred embodiment when taken in conjunction with the attached drawings and appended claims.

BEST MODE(S) FOR CARRYING OUT THE INVENTION

Figure 1:
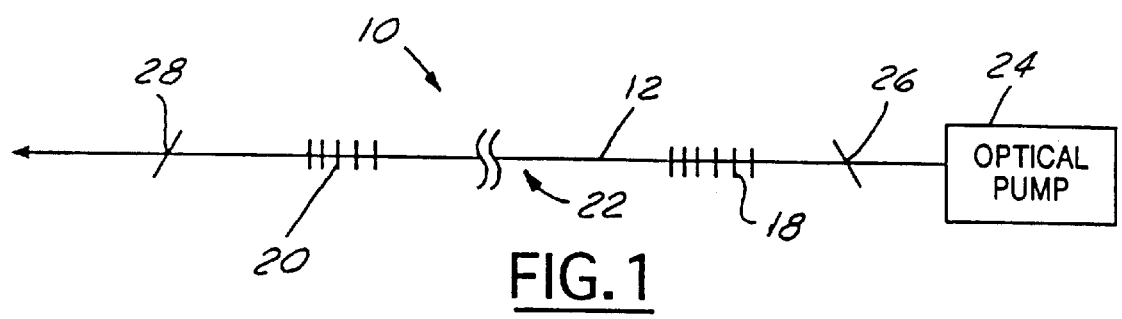
FIG. 1 is diagrammatic elevational view of an optical fiber laser formed according to the present invention.

Referring to FIG. 1, an optical fiber laser 10 has an optical fiber 12 that has a first end 26 and a second end 28. First end 26 has a first grating 18, and second end 28 has a second grating 20. An optical cavity 22 is defined between first grating 18 and second grating 20. First grating 18 and second grating 20 are regions of optical fiber 12 that have a refractive index that varies periodically.

An optical pump 24 is coupled to First end 26. As will be further described below, optical pump 24 is preferably coupled to an inner cladding of optical fiber 12. Ends 26 and 28 are preferably polished or cleaved on an angle to reduce back reflection.

Figure 2:
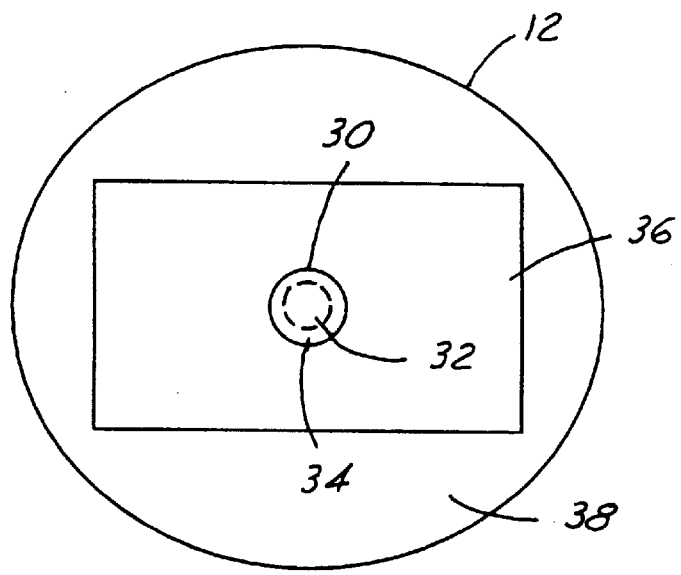
FIG. 2 is a cross-sectional view along line 2—2 of FIG. 1.

Referring now to FIG. 2, optical fiber 12 has a core 30 that has a central region 32 and a collar region 34. Core 30 is surrounded by an inner cladding 36. Inner cladding 36 is surrounded by an outer cladding 38.

Core 30 surrounded by inner cladding 36 forms a single-mode fiber whose mode diameter is preferably between 6 and 10 $\mu$m, most preferably 8.5 $\mu$m. Inner cladding 36 is formed of silica, although other types of glass are acceptable. Collar region 34 is doped with rare-earth ions such as ytterbium (Yb), neodymium (Nd), or erbium (Er). Collar region 34 may be formed as part of core 30 or part of cladding 36. That is, collar 34 may have the same index of refraction as the core 30 or cladding 36. The rare earth elements are lasing dopants. Central region 32 preferably has no rare-earth dopants therein. The size of collar region 34 is chosen from the requirement that 10–50% of the total power in the single mode of the fiber propagates through the rare-earth doped part of the core. Those skilled in the art will easily calculate the exact size of the collar from the above requirement and other fiber parameters, such as its core and cladding refractive indices and laser wavelength.

In addition to rare-earth dopants, core 30 may also be doped with other elements that increase its refractive index above that of the inner cladding. Such index-modifying dopants are required for creating guiding conditions in the single-mode fiber. Germania, phosphorous, and alumina are commonly used for index modification.

Inner cladding 36 is multimode, preferably made of pure silica and is not doped. Inner cladding 36 has a rectangular cross section and completely surrounds core 30 adjacent to collar region 34. A suitable dimension for inner cladding is 170 by 330 μm. As described above, the output of optical pump 24 is coupled into inner cladding 36.

Outer cladding 38 has any cross section, e.g. circular, and is formed of a suitable polymer such as a fluoropolymer or a low index glass. The index of refraction of the second cladding should be less than the index of refraction of inner cladding 36. A suitable index of refraction is about 1.38 or less.

Optical pump 24 is preferably formed of commercially available diode lasers or diode-coupled fiber bundles. Optical pump 24 preferably has an operating wavelength range matching the absorption band of the active laser dopants. Commonly, this is from 800 to 1000 nm. The light from optical pump 24 may enter inner cladding 36 from first end 26. This is referred to as "end-pumping.

In operation, it is desirable to operate the laser at a short wavelength. Commonly, Yb-doped glasses are attractive materials for making efficient 970–1100 nm fiber lasers. As described above, wavelengths of less than 1064 nm are preferred in some applications. However, it has been found that a 1064 nm laser has parasitic lasing occurring at longer wavelengths, e.g., at 1082 nm. As described in the background, the parasitic lasing may require the decrease of the overall length of the laser. In many applications, it is desirable to have a long length, since it improves the overall system efficiency.

Generally, the discrimination of a design wavelength against parasitic lasing on the long wavelength side of the spectrum is achieved by reducing the threshold of the design wavelength over that for the parasitic wavelength. Yb and Er doped lasers operate on the three-level scheme. Therefore, a critical level of inversion is required overcoming initial absorption and achieving gain. Because of material parameters, this critical intensity is higher for shorter wavelengths. When the critical intensity is already reached for a longer wavelength, but not for the design wavelength, parasitic lasing occurs even with a minimal feedback if the length of the laser medium is long enough. By reducing the overlap Γ between the fiber mode and the dopants, the threshold for the parasitic doping is raised. Higher higher inversions are required to achieve operation at the parasitic wavelength than would be required with uniform doping of the core. This higher inversion may prove sufficient for achieving lasing at the design wavelength prior to reaching the threshold of the parasitic operation. Placing Yb dopants only into collar region 34 does not affect the interaction with the pump radiating propagating inside the multi-mode inner cladding 36 since the pump distribution is nearly uniform across the entire cladding. The reduced overlap may also decrease the gain at the design wavelength. This may be compensated for by using slightly higher reflecting gratings that serve as resonator reflectors at the design wavelength.

In the illustrative example, we consider a fiber laser with the first grating 18 having reflectivity of 0.999, the second grating 20 having reflectivity equal to 0.1, the design wavelength is 1064 nm, and the broad band reflections for parasitic operations are reduced down to $10^{-4}$.

Figure 3A:
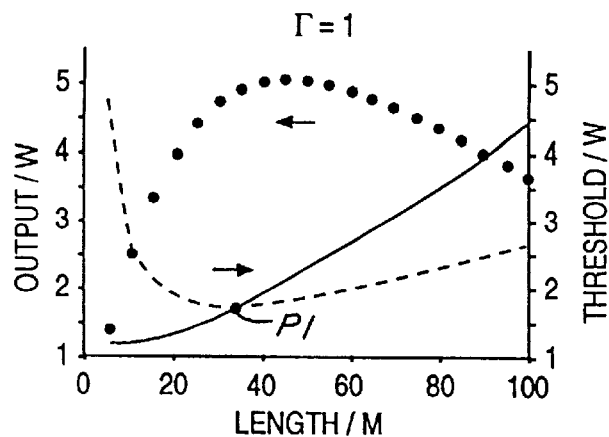
FIG. 3(A) is a plot of laser and parasitic thresholds as well as laser outputs in Watts calculated versus length of a fiber laser having a uniform doping distribution.
Figure 3B:
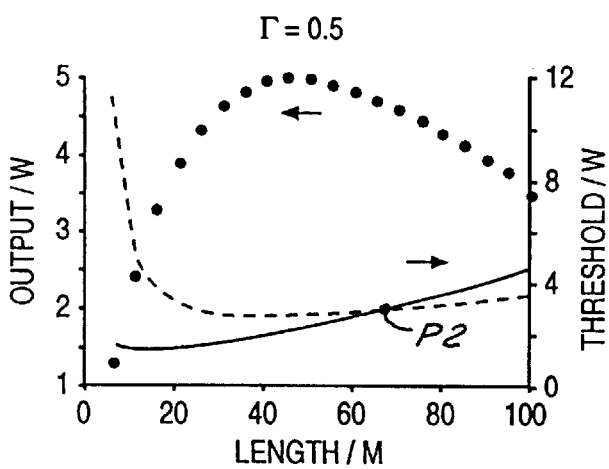
FIG. 3(B) is a plot of laser and parasitic thresholds as well as of output in Watts calculated versus length of a laser having collar doping with an overlap value of 0.5.
Figure 3C:
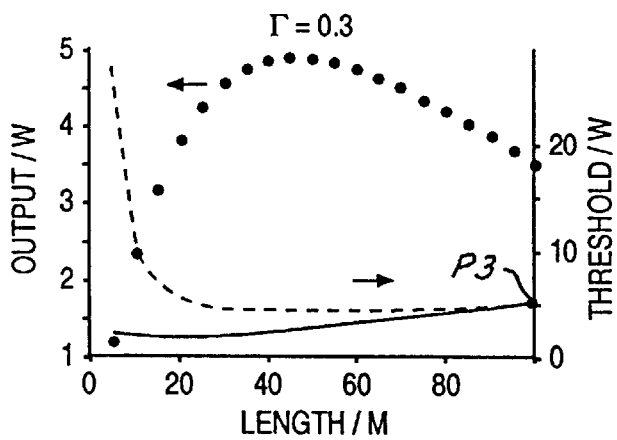
FIG. 3(C) is a plot of laser and parasitic thresholds as well as output in Watts calculated versus length of a laser having collar doping with an overlap value of 0.3.

Referring now to FIGS. 3(A), 3(B), and 3(C), the overlap values (Γ) are varied between 1, 0.5, and 0.3, respectively. An overlap value of 1 as shown in FIG. 3(A) corresponds to the uniform distribution as is performed in the prior art. As shown, the threshold for 1064 nm is below the threshold for 1082 nm at point $P_1$, if the length of the fiber laser is less than that at the intersection point $P_1$, which occurs at less than 40 meters in length. Also shown in the figure is the output of the fiber laser versus its length. It is obvious from the figure that a longer fiber length of about 45–50 m is needed to reach maximum possible output.

Referring now to FIG. 3(B), the overlap value (Γ) is reduced to 0.5. In this embodiment, the length of the fiber before crossing the parasitic threshold at point $P_2$ is nearly 60 meters. This length is already sufficient for reaching the optimal fiber output at about 45–50 m.

Referring now to FIG. 3(C), the overlap value (Γ) is reduced to 0.3. The operative length for the 1064 nm wavelength is approximately 100 meters where the threshold for the 1064 nm wavelength crosses the parasitic wavelength at point $P_3$. Therefore, the operating conditions may be changed without parasitic lasing.

While the above example is used with a design wavelength of approximately 1064 nm, it is believed that further reductions in design wavelength may be accomplished using teachings of the present invention.

While particular embodiments of the invention have been shown and described, numerous variations and alternate embodiments will occur to those skilled in the art. Accordingly, it is intended that the invention be limited only in terms of the appended claims.

What is claimed is:

1. An optical fiber laser comprising:
   an optical fiber having a first end and a second end, said optical fiber having:
   a core having an undoped central region and a collar surrounding said core, said collar doped with a lasing dopant;
   an inner cladding surrounding said core;
   a first grating disposed at said first end; and
   a second grating disposed at said second end.

2. An optical fiber laser as recited in claim 1 further comprising an outer cladding coupled around said inner cladding.

3. An optical fiber laser as recited in claim 1 further comprising an optical pump coupled to said inner cladding.

4. An optical fiber laser as recited in claim 1 wherein said first grating has a first reflectivity and said second grating has a second reflectivity less than said first reflectivity.

5. An optical fiber laser as recited in claim 1 wherein the said core is a single-mode core.

6. An optical fiber laser as recited in claim 1 wherein said inner cladding has a rectangular cross-section.

7. An optical fiber laser as recited in claim 1 wherein said lasing dopant comprises a rare earth element from the group consisting or ytterbium, erbium and neodymium.

8. An optical fiber laser as recited in claim 1 wherein said collar overlaps with 10%–50% of a laser power propagating in the said core.

9. An optical fiber laser as recited in claim 1 wherein said core has a predetermined lasing wavelength below 1065 nm.

10. An optical fiber laser comprising:
    an optical fiber having a first end and a second end, said optical fiber having:
    a single-mode core having an undoped central region and a collar surrounding said core, said collar doped with a lasing dopant ions;

an inner cladding surrounding said core;

a first grating disposed at said first end; and a second grating disposed at said second end;

an outer cladding coupled around said inner core; and an optical pump coupled to said inner cladding.

11. An optical fiber laser as recited in claim 10 wherein said first grating has a first reflectivity and said second grating has a second reflectivity less than said first reflectivity.

12. An optical fiber laser as recited in claim 10 wherein the said core is a single-mode core.

13. An optical fiber laser as recited in claim 10 wherein said inner cladding has a rectangular cross section.

14. An optical fiber laser as recited in claim 10 wherein said lasing dopant is a rare earth element from the group consisting or ytterbium, erbium and neodymium.

15. An optical fiber laser as recited in claim 10 wherein said collar overlaps with 10%–50% of a laser power propagating in the said core.

16. An optical fiber laser as recited in claim 10 wherein said core has a predetermined lasing wavelength, said lasing wavelength is below 1065 nm.

17. A method of forming a laser comprising the steps of:

doping a lasing dopant into an optical core to form a doped collar region and a substantially undoped center region;

forming a grating on a first end and a second end of said core;

surrounding the optical core with an inner cladding; and coupling the inner core to an optical pump.

18. A method of forming a laser as recited in claim 17 wherein said step of doping comprises the step of increasing the threshold for a parasitic lasing wavelength.

19. A method of forming a laser as recited in claim 17 wherein the step of doping comprises the steps of doping a rare-earth element into the optical core.

* * * * *